(12) United States Patent
Berg et al.

(10) Patent No.: US 11,770,193 B2
(45) Date of Patent: Sep. 26, 2023

(54) MITIGATING INSTABILITY IN CASCADED OPTICAL POWER CONTROLLERS

(71) Applicant: Ciena Corporation, Hanover, MD (US)

(72) Inventors: Loren Scott Berg, Richmond (CA); Bing Liu, Kanata (CA); David Bownass, Ottawa (CA)

(73) Assignee: Ciena Corporation, Hanover, MD (US)

( * ) Notice: Subject to any disclaimer, the term of this patent is extended or adjusted under 35 U.S.C. 154(b) by 56 days.

(21) Appl. No.: 17/386,615

(22) Filed: Jul. 28, 2021

(65) Prior Publication Data

US 2023/0030860 A1     Feb. 2, 2023

(51) Int. Cl.
*H04B 10/27* (2013.01)
*H04B 10/80* (2013.01)

(52) U.S. Cl.
CPC .................. *H04B 10/807* (2013.01); *H04B 10/27* (2013.01)

(58) Field of Classification Search
CPC ............... H04B 10/27; H04B 10/07955; H04B 10/0793; H04B 10/0797
See application file for complete search history.

(56) References Cited

U.S. PATENT DOCUMENTS

| | | | |
|---|---|---|---|
| 5,903,685 A | 5/1999 | Jones et al. | |
| 6,163,399 A | 12/2000 | Berg | |
| 6,236,499 B1 | 5/2001 | Berg et al. | |
| 6,757,098 B2 | 6/2004 | Berg et al. | |
| 8,260,141 B2 | 9/2012 | Berg | |
| 8,364,036 B2 | 1/2013 | Boertjes et al. | |
| 9,344,191 B2 | 5/2016 | Al Sayeed et al. | |
| 9,419,708 B2 | 8/2016 | Rad et al. | |
| 9,485,013 B2 | 11/2016 | Al Sayeed et al. | |
| 9,496,980 B2 | 11/2016 | Bhatnagar et al. | |
| 9,577,763 B2 | 2/2017 | Al Sayeed et al. | |
| 9,729,265 B2 | 8/2017 | Hurley et al. | |
| 9,774,392 B2 | 9/2017 | Doucet et al. | |
| 9,806,803 B2 | 10/2017 | Bownass et al. | |
| 9,853,762 B2 | 12/2017 | Evans et al. | |

(Continued)

*Primary Examiner* — Dzung D Tran
(74) *Attorney, Agent, or Firm* — Baratta Law PLLC; Lawrence A. Baratta, Jr.

(57) ABSTRACT

Systems and methods for stabilizing power levels from excessive oscillations in an optical line system of a communications network are provided. A method, according to one implementation, includes the step of detecting a perturbation of an optical power level in an optical line system having a plurality of cascaded optical power controllers. The method also includes the step of determining an estimated location to which a power controller of the plurality of cascaded optical power controllers is positioned downstream of the perturbation with respect to other power controllers of the plurality of cascaded optical power controllers. Based on the estimated location to which the power controller is positioned downstream of the perturbation, the method also includes the step of providing feedback in a control loop to reduce the effects of the perturbation.

20 Claims, 9 Drawing Sheets

(56) References Cited

U.S. PATENT DOCUMENTS

| | | | |
|---|---|---|---|
| 9,973,295 | B2 | 5/2018 | Al Sayeed et al. |
| 10,263,386 | B1 | 4/2019 | Sridhar et al. |
| 10,361,957 | B1 | 7/2019 | MacKay et al. |
| 10,547,404 | B1 | 1/2020 | Al Sayeed et al. |
| 10,680,737 | B1 | 6/2020 | Al Sayeed et al. |
| 10,686,543 | B1 | 6/2020 | Al Sayeed et al. |
| 10,784,981 | B2* | 9/2020 | Boertjes et al. ... H04B 10/0775 |
| 10,826,601 | B2 | 11/2020 | Bhatnagar et al. |
| 10,868,614 | B2 | 12/2020 | Al Sayeed et al. |
| 10,965,373 | B1 | 3/2021 | Al Sayeed et al. |
| 2002/0174207 | A1* | 11/2002 | Battou ............... H04L 41/046 709/223 |
| 2003/0058497 | A1 | 3/2003 | Park et al. |
| 2009/0116837 | A1* | 5/2009 | Boertjes et al. .... H04J 14/0284 398/58 |
| 2014/0112660 | A1* | 4/2014 | Al Sayeed et al. . H04J 14/0221 398/38 |
| 2015/0117858 | A1* | 4/2015 | Al Sayeed et al. ....................... H04B 10/07955 398/38 |

* cited by examiner

150

160

170

180

MITIGATING INSTABILITY IN CASCADED OPTICAL POWER CONTROLLERS

TECHNICAL FIELD

The present disclosure generally relates to optical networking systems and methods. More particularly, the present disclosure relates to controlling optical power in an optical line system of a network to reduce overshoot and undershoot.

BACKGROUND

Generally, an optical network includes multiple optical line systems each including optical fibers, amplifiers, multiplexers, demultiplexers, etc. Often, an optical line system may include multiple amplifiers that can be controlled to attempt to keep the optical power near an ideal level. However, it can be common for multiple optical amplifiers, deployed in a cascaded arrangement, to each react to changes in the optical levels. When each of the multiple optical amplifiers alters the optical power level based on local monitoring, it is possible that the entire optical line system can overcompensate to a slight disturbance in the optical power in one direction or the other.

Since cascaded power controllers in optical lines systems are known to be unstable, they are often avoided. Cascaded power controllers are typically only used if they can be orchestrated by a higher-level controller, which only allows one such controller to act at any given time. Other solutions may involve signaling to downstream nodes via control bits to turn off all downstream controllers. However, there is often a lag involved is such a signaling scheme. Both of these solutions are presently employed in existing optical line systems. A problem arises when an optical line system employs optical equipment from different vendors, referred to as a disaggregated optical line system. However, neither of the above solutions is available in the context of a fully disaggregated optical line system that has no east-west communications and no higher-level orchestration.

Cascaded power controllers can only be scaled to a certain degree before deleterious behavior is encountered with its associated performance penalties. As described above, present solutions to this problem are not available in the context of a fully disaggregated optical line system with no east-west communications and no orchestration of the multiple controllers. Therefore, there is a need in the field of optical line systems to mitigate unstable responses to optical power perturbations or disturbances, even in disaggregated systems.

BRIEF SUMMARY

The present disclosure is directed to systems, methods, and non-transitory computer-readable media having functionality for stabilizing power levels in an optical line system of a communications network. A system, according to one implementation, includes a processing device and a memory device configured to store a computer program having instructions. The instructions, when executed, enable the processing device to detect a perturbation of an optical power level in an optical line system having a plurality of cascaded optical power controllers. Also, the instructions enable the processing device to determine an estimated location to which a power controller of the plurality of cascaded optical power controllers is positioned downstream of the perturbation with respect to other power controllers of the plurality of cascaded power controllers. Based on the estimated location to which the power controller is positioned downstream of the perturbation, the processing device is configured to provide feedback in a control loop to reduce the effects of the perturbation.

According to some embodiments, the system may be further defined whereby the optical line system can be a disaggregated system in which there is no communication among the plurality of cascaded optical power controllers and there is no high-level management for orchestrating the plurality of cascaded optical power controllers. The step of determining the estimated location to which the power controller is positioned downstream of the perturbation may include a self-discovery procedure that includes determining if the power controller is the first of the plurality of cascaded optical power controllers downstream of the perturbation. This self-discovery procedure may include determining how the power controller is performing relative to expectations of a classical response to a perturbation in a single controller arrangement. The step of providing feedback in the control loop to reduce the effects of the perturbation may include using an Integral-only control procedure, which in turn may include using a damped integral control to reduce oscillation overshoot and reduce oscillation undershoot.

Furthermore, the step of determining the estimated location to which the power controller is positioned downstream of the perturbation with respect to other power controllers may be based on one or more of a first parameter of how fast an error term is decreasing and a second parameter of whether or not the optical power level has experienced significant overshoot or undershoot. The estimated location to which the power controller is positioned downstream of the perturbation may be based on one or more of the first parameter representing a decrease in the error rate that is above a first predetermined threshold and the second parameter representing an overshoot or undershoot that is above a second predetermined threshold. In some cases, providing feedback in the control loop to reduce the effects of the perturbation may include reducing an Integral gain (Ki) parameter. Also, the control loop may be a Proportional-Integral-Derivative (PID) control loop, where providing feedback in the control loop may include applying a one-time proportional term (P) to the PID control loop.

In some implementations, this system may also be defined whereby each of the plurality of cascaded optical power controllers is part of a Reconfigurable Optical Add/Drop Multiplexer (ROADM). In addition, the step of providing feedback in the control loop to reduce the effects of the perturbation may include balancing a linear noise parameter with a non-linear noise parameter. The non-linear noise parameter may be an optical Kerr effect.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for controlling optical power in an optical line system, such as an optical line system in an optical communications network. More particular, the embodiments of the present disclosure are directed to controlling optical power in a system where there is no east-west communication (e.g., communication between cascaded optical controllers) and no management for orchestrating the various cascaded optical controllers. For example, in a disaggregated optical network where equipment from multiple vendors may be in use, there may not be any standard orchestration protocols for managing how each optical controller in the optical line system may react to a perturbation or disturbance in the optical power. Thus, the embodiments of the present disclosure are configured to overcome the issue of no overhead management. Instead of allowing each optical controllers to compensate for the same perturbation event at each local point in the system, which can cause an unstable overreaction to the perturbation in the optical line system, the embodiments of the present disclosure are configured to damp control responses to reduce overshoot and undershoot in the optical line system. By locally inferring that an optical controller is a controller immediately downstream from the perturbation, appropriate action can be taken to ensure that the overall system response is what is desired.

Figure 1:
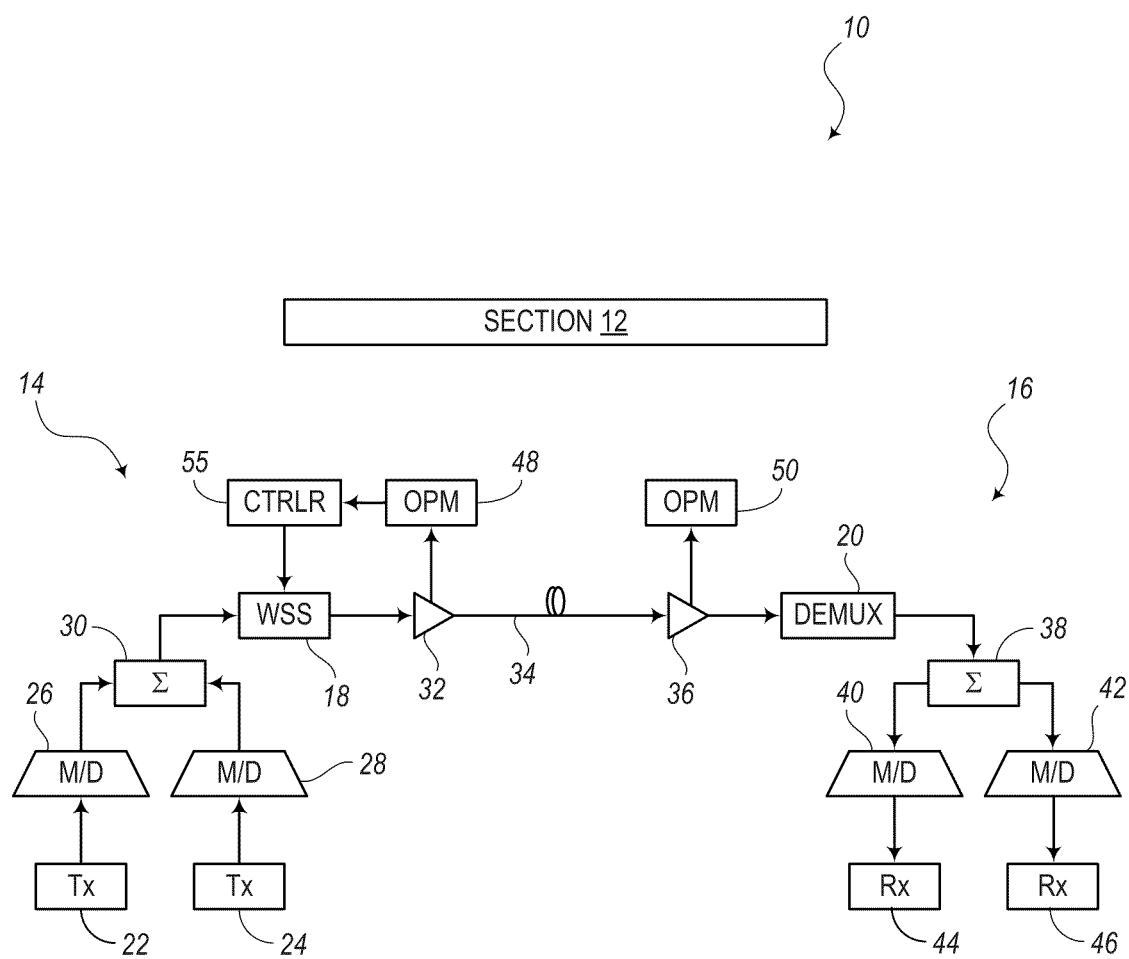
FIG. 1 is a schematic diagram illustrating a Reconfigurable Optical Add/Drop Multiplexer (ROADM) section of an optical line system in a network, according to various embodiments of the present disclosure.

FIG. 1 is a schematic diagram illustrating an embodiment of a portion of an optical line system 10 of a network. As shown, the optical line system 10 includes a Reconfigurable Optical Add/Drop Multiplexer (ROADM) section 12, which is positioned between a first ROADM node 14 and a second ROADM node 16. The ROADM section 12 may be between degrees of the ROADM nodes 14, 16, and as described herein, multiple cascaded ROADMs or optical nodes may mean that optical signals are configured to traverse multiple ROADM sections. In the exemplary embodiment of FIG. 1, the degree at the ROADM node 14 is formed in part by a Wavelength Selective Switching (WSS) device 18 and the degree at the ROADM node 16 is formed in part by a demultiplexer 20. Those of ordinary skill in the art will recognize other implementations are also contemplated by the systems and methods described herein. For example, the ROADM node 14 could include a multiplexer and the ROADM node 16 could include a WSS. Alternatively, both the ROADM nodes 14, 16 could include WSSs. Further, other physical implementations are also contemplated for the ROADM nodes 14, 16 described herein besides WSSs, multiplexers, and demultiplexers. That is, the ROADM section 12 with the WSS 18, the demultiplexer 20, and other components is described herein for illustration purposes as one exemplary type of ROADM section. Furthermore, reference is made herein to ROADMs for illustration purposes. Those of ordinary skill in the art will appreciate that the systems and methods described herein can apply to any optical spectral adjusting element such as a ROADM, an amplifier site, a dynamic gain equalization site, and the like.

The ROADM node 14 includes a first transmitter (Tx) device 22 and a second Tx device 24 coupled to a first channel Multiplexer/Demultiplexer (M/D) device 26 and a second channel M/D device 28, respectively. It may be noted that the ROADM node 14 can alternatively include any number of transmitters. The M/D devices 26, 28 are configured to multiplex wavelengths from the Tx devices 22, 24, respectively. The multiplexed signals are provided to a combiner 30, which combines the outputs from the M/D devices 26, 28 into a single input to the WSS 18. In an exemplary embodiment, the M/D devices 26, 28 can operate in a range of an optical spectrum (e.g., the blue and red ranges) with the Tx devices 22, 24 being a wavelength in the associated ranges of optical spectrum. The WSS 18 is generally a device receiving the input from the combiner 30 or the like with a number of DWDM wavelengths contained therein along with a plurality of switchable directions in which each of the DWDM wavelengths can be selectively switched thereto. An output of the WSS 18 connects to a post-amplifier 32 which can be an Erbium Doped Fiber Amplifier (EDFA) or the like. The ROADM section 12 includes optical fiber 34 connecting the ROADM nodes 14, 16.

At the ROADM node 16, a pre-amplifier 36 receives the output of the post-amplifier 32. The pre-amplifier 36 connects to the demultiplexer 20, which provides Dense Wavelength Division Multiplexing (DWDM) wavelengths from the node 16 to a splitter 38, which splits the DWDM wavelengths to M/D devices 40, 42. The M/D devices 40, 42 are configured to provide individual wavelengths to receiver (Rx) devices 44, 46, respectively. For example, the Rx device 44 is configured for communication with the Tx device 22 and the Rx device 46 is configured for communication with the Tx device 24 via the various components in the ROADM section 12. Note, the splitter 38 and the M/D devices 40, 42 basically provide the opposite functionality as the combiner 30 and the M/D devices 26, 28.

Additionally, both the ROADM nodes 14, 16 include optical power monitors (OPMs). For example, the first ROADM node 14 includes a first OPM 48 and the second ROADM node 16 includes a second OPM 50, each of which can tap a small portion of the outputs or inputs to the nodes 14, 16, respectively, for monitoring thereof. For example, the OPM 48 can connect to a tap off the post-amplifier 32 and the OPM 50 can connect to a tap off the pre-amplifier 36. The ROADM node 14 also includes a power controller 55 communicatively coupled to the OPM 48 and the WSS 18. The power controller 55 is configured to run in a closed-loop arrangement, getting updated optical power readings from the OPM 48 in order to achieve a specific power target at the output of post-amplifier 32 through adjustments of the WSS 18. Specifically, the power controller 55 is configured to implement the various systems and methods described herein.

In the ROADM section 12, there could be many ways to add a wavelength in a non-service affecting way to other in-service wavelengths already present over the optical fiber 34. The simplest possible way is to open a pixel in the WSS 18 with an estimated target attenuation to achieve the same launch power as the other in-service wavelengths. However opening WSS pixels in an open loop (since before opening up the pixel, there is no light ending up in the OPM 48, and hence no feedback) may not be accurate and often ends up with an overshoot or undershoot when compared with a desired launch power. Hence, a simple control loop by the power controller 55 is required to run externally that will monitor the offset or error from the target by measuring the feedback from the OPM 48, and will try to compensate for that accordingly. The power controller 55 could be a Proportional-Integral-Derivative (PID) controller, a Proportional-Integral (PI) controller, an Integral-only (I) controllers, or the like. Thus, the power controller 55 described in the present disclosure may include any suitable combination of proportional, integral, and/or derivative functionality for performing control processes.

Therefore, the power controller 55 in various embodiments may include proportional control functionality, integral control functionality, and/or derivative control functionality in a control loop or feedback loop arrangement. The power controller 55 can continuously control the WSS 18 as needed based on the condition of the post-amplifier 32 measured by the OPM 48. The power controller 55 can calculate an error value as a difference between a desired power level and a measured power level and apply corrections based on a suitable combination of the proportional (P), integral (I), and derivative (D) variables.

The P variable is proportional to a current value of the error between desired and measured power levels and can take into account a gain factor "K." The I variable accounts for past values of the error (i.e., difference between desired and measured power levels) and integrates them over time. If there is a residual error after proportional processing steps, the I variable processing can eliminate this residual error by adding a control effect due to the historic cumulative value of the error. When the error is eliminated, the I variable will be reduced, which can result in the proportional effect diminishing as the error decreases. The D variable may be processed to estimate future trends of the error (e.g., difference between desired and measured power levels), based on its current rate of change. Modification to the power controller 55 based on the D variable can be used as a proactive or anticipatory process to reduce the effect of the error by exerting a control influence generated by the rate of error change. One goal of the combination of PID control is to provide a damping effect to the error between the desired (or ideal) optical power level and the optical power level measured by the OPM 48.

In some embodiments, the power controller 55 may be configured as an Integral-only controller. The I variable may be configured to increase action in relation not only to the error but also the time for which it has persisted. Thus, if applied changes to the WSS 18 is not enough to bring the error to a desired level (e.g., zero), the error can be compensated for over time. An integral-only controller may be configured to bring the error to zero, but it may do so in a slower manner, since the action would be small at first and may need more time to make significant progress. Nevertheless, in disaggregated system, where there may be a tendency for overreaction in conventional systems, as mentioned above, such a response having a slightly slower reaction time has been demonstrated (e.g., as described below with respect to FIGS. 7 - 14) to control damping response and reduce overshoot and undershoot. Therefore, reducing these overshoots and undershoots can provide stability in the optical line system 10 and not overcompensate for errors as is common in conventional systems.

In order to achieve a controlled state in the optical line system 10, the power controller 55 may be configured to attempt to response to a perturbation or disturbance in the optical line system 10 in a manner so as to control the damping effect and thereby reduce overshoot and undershoot. The power controller 55 is able to provide a control response by tweaking the WSS 18 in a damped manner. Again, the I variable can be used as a primary response factor (i.e., while minimizing or eliminating the P variable and/or D variable). The I variable, related to the magnitude and duration of the error may be the sum of the instantaneous error over time and gives an accumulated offset for correcting the error. The accumulated error may be multiplied by an integral gain (Ki) and added to the controller output. For example, the integral term may be:

$$I_{out} = K_i \int_0^t e(\tau) d(\tau)$$

The integral term can be used to move the error correction process towards a desired setpoint or power level and eliminate a residual steady-state error that occurs with a pure proportional controller (if any). Normally, cascaded control may involve the coordination of multiple controllers in a linear fashion to yield better performance. However, as mentioned above, in an optical line system or optical network where there is no communication between optical controllers and there is no orchestration from a higher-level management system, each power controller may be configured in conventional systems to act on their own. Thus, the power controller 55 of the present disclosure is configured to accommodate the control of optical power in a system where there may be tendency for each individual power controller to act on its own, based on local monitoring, to try to compensate for errors (e.g., perturbations, disturbances, etc.) in the optical system. With any orchestration or east-west communication, the compensation at each individual power controller can result in the overcompensation of control processes, which can lead to an unstable condition. Thus, the damping processes of the power controller 55 of the present disclosure can minimize or even eliminate similar overreactions.

In some embodiments, the power controller 55 may include a PI (Proportional-Integral) control solution or an I-only (Integral-only) control solution. Hence, adding a wavelength through the single WSS 18 over the single ROADM section 12 may be relatively easier to achieve. It may be noted that the WSS 18 is described herein as an exemplary power adjusting device with respect to the channel. Those of ordinary skill in the art will recognize the systems and methods described herein contemplate other devices for channel power adjustments such as, without limitation, variable optical attenuators, optical amplifiers, dynamic gain equalizers, etc.

Figure 2:
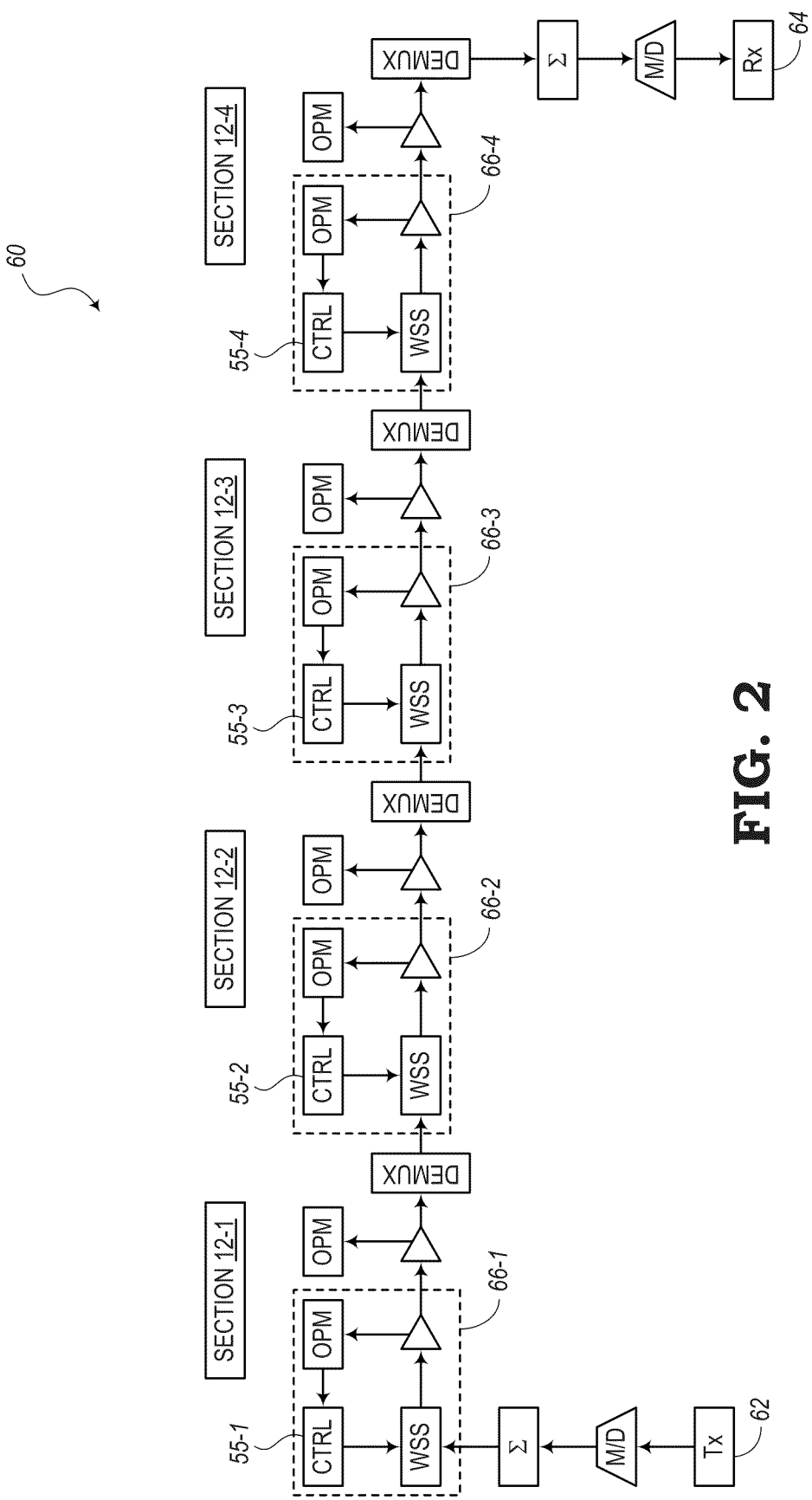
FIG. 2 is a schematic diagram illustrating a network having multiple ROADM sections, according to various embodiments.

FIG. 2 is a schematic diagram illustrating an embodiment of a network 60 having multiple ROADM sections. In this example embodiment, the network 60 may include four linearly cascaded ROADM sections 12-1, 12-2, 12-3, 12-4. Each of the linearly cascaded ROADM sections 12-1, 12-2, 12-3, 12-4 can include components described with respect to the ROADM section 12 shown in FIG. 1. The network 60 can include a Tx device 62 which ultimately communicates with a Rx device 64 over the linearly cascaded ROADM sections 12-1, 12-2, 12-3, 12-4. For example, the Tx device 62 and the Rx device 64 can include a 40 Gb/s wavelength in between 1530 to 1565 nm. Conventionally, in order to add a wavelength or channel from the Tx device 62 over the cascaded ROADM sections 12-1, 12-2, 12-3, 12-4, a simple idea is to add them in sequence, that is, starting the add in a downstream WSS section in only when the upstream is completed with its add operation. For example, the ROADM section 12-2 does not begin until the ROADM section 12-1 is complete. In such case, the same control loop can be in operation for each WSS in each of the ROADM sections 12-1, 12-2, 12-3, 12-4, and are able to add the channel as soon as upstream is done with add.

It is possible to add the optical channels or wavelengths in parallel over the multiple ROADM sections 12-1, 12-2, 12-3, 12-4 using a damped power controllers 55-1, 55-2, 55-3, 55-4 at each respective ROADM section 12-1, 12-2, 12-3, 12-4 for control of the respective WSSs. A power target may be provided to each power controller 55-1, 55-2, 55-3, 55-4 instead of a fixed target loss or attenuation. The target attenuation based loss controllers may not be feasible in this case as a steady attenuation cannot be set as target unless the controllers are acting in sequence. It is possible to develop the power controllers 55-1, 55-2, 55-3, 55-4 as PID power controllers, I-only power controllers, or other suitable type of controller for the WSS with a damped unit step response in order to make sure that no overshoot appears during channel add. The target power can be set as the power required to achieve at the output of the WSS, while the power delta between the target and the measured can serve as the measured error amount based on which power controller is configured to act. In this respect, each power controller 55 at each ROADM section 12 is configured to determine if it is the first power controller downstream from a perturbation or disturbance. For example, the perturbation may be caused by break in a fiber, a fiber pinch condition, or other type of condition that may affect the power levels along the various optical fibers. If a power controller 55 determines that it is indeed the first downstream controller from the perturbation, then this power controller 55 is configured to provide a specific response to compensate for the perturbation. Otherwise, if it is determined that it is not the first downstream controller, then this particular power controller may be configured not to attempt any type of compensation, but instead allow another power controller (e.g., further upstream and closer to the perturbation) to provide any necessary compensation or remediation responses.

Again, with the traditional power controller approach, the problem starts when the controllers, running at each of the WSSs installed in cascade, run in parallel and are trying to achieve their own target output power per channel with the same unit step response. If each of the downstream controllers applies the same unit step response at same cadence, the channels to be added are soon going to overshoot by a significant amount due to the rapid change in input powers, since the upstream controllers are converging at the same time. Such overshoot may cause serious non-linear interference to the neighboring in-service wavelengths.

In some embodiments, the control loops 66-1, 66-2, 66-3, 66-4 or feedback loops (e.g., comprising the WSS 18, amplifier 32, OPM 48, and power controller 55) at each ROADM section 12 (FIGS. 1 and 2) may be configured to add a channel in parallel over the multiple cascaded ROADM sections 12. The OPM 48 provides per channel power measurements to the power controller 55 and the power controller 55 implements an algorithm for determining power settings for the added channel on the WSS 18. Again, as described herein, the WSS 18 is one exemplary ROADM device contemplated for use with the power controller 55. Other hardware implementations are also contemplated including any optical devices for ROADM implementation that allow for variable per channel power settings by the power controller 55.

The ROADM nodes have degrees. Each degree represents an ingress and/or egress point for the ROADM node 14, 104. As described herein, the degree can be formed in part by the WSS 18 and/or the demultiplexer 20. Of course, other configurations and hardware is contemplated. The systems and methods described herein with respect to the power controller 55 and the control loop 66 provide an optimized way to quickly determine a target power of a channel (i.e., wavelength) being added to a network. Generally, the systems and methods determine attenuation settings for the channel egressing a ROADM degree at the node where the control loop 66 is located. This can include setting pixel values of the WSS 18. Of course, the WSS 18 can be generally described as a ROADM degree in which the wavelength being added can be selectively attenuated by the power controller 55 and the control loop 66 based on the methods described herein. The power controller 55 may include a processing device configured to implement the algorithm which generally includes the control loop 66 (or feedback loop) for applying any suitable combination of PID processing. The power controller 55 may also include a mechanism for handing variable input power, and a mechanism for adapting to plant drift and aging effects.

In one embodiment, a response of the power controller 55 in each WSS iteration cycle may be determined by the following equation:

$$d_t^s = (1-k_s)d_t^m - \left(k_p * e_t^m + k_I * \sum_t \left(e_t^m * \Delta t\right) + k_d * \frac{\Delta}{\Delta t}\left(e_t^m\right) + k_e * \left(\left|\Delta e_t^x\right| - \left|\Delta e_{t-1,t}^m\right|\right)\right) + k_s * d_{t-1}^s$$

where:
- $d_t^s$ refers to the pixel drive value set (e.g., via Simple Network Management Protocol (SNMP) commands) in WSS iteration cycle t
- $d_t^m$ refers to the measured drive or attenuation in WSS iteration cycle t that is estimated as input minus output minus the insertion loss at WSS mux port
- $e_t^m$ refers to the measured error in cycle t that is the delta between target power and measured power at WSS mux output
- $\Delta e_t^x$ defines the expected error change in iteration cycle t that is also same as the PID response applied in previous iteration cycle (t-1)
- $\Delta e_{t-1,t}^m$ refers to the measured error change between previous and current iteration cycle
- $d_{t-1}^s$ stands for the pixel drive value set in previous WSS iteration cycle (t-1), and
- $k_p, k_I, k_d$ refer to PID control coefficients
- $k_s$, and $k_e$ are the coefficients used for considering WSS pixel drift and input power variation into account The foregoing equation allows adding wavelengths in parallel over multiple cascaded segments using the control loop 66, the mechanism for handing variable input power 404, and the mechanism for adapting to plant drift and aging effects 406.

For each control loop 66 (e.g., including PID processing algorithms), the respective power controller 55 may internally use a three-state PID control process with damped response where the PID response is proportionate to an error term between the measured power from the OPM 48 and a set target power to achieve. At start of the iteration, the power controller 55 retrieves a Target Power at the WSS 18 output, a scaled value from amplifier target peak power (e.g., the target launch power for that wavelength to fiber), and also the Measured Power at the WSS 18 output that is a scaled power value measured from the OPM 48. The PID proportionate is estimated as described below (starting from iteration denoted as "iter" from 0) where it includes one or more of proportional, integral, and derivative variables of the existing error, or a power delta to reach.

In order to avoid any oscillations on the power controller 55 response which is an inherited problem of PID controllers, the derivative coefficient is set to zero if an overshoot is detected in the previous iteration. Hence if any time an overshoot takes place, the power controller 55 converges to a damped PI controller in order to avoid oscillations on the power controller response. The control loop 66 can include the following computations to determine the P, I, and D values for each iteration, iter:

Based on absolute magnitude of errors, the three states for the power controller 55 is defined where the coefficients Kp, Ki, and Kd are chosen in a such a way that the power controller 55 response remains always damped until complete convergence. To start up the power controller 55 from dark to add a wavelength, all three coefficients exist chosen for a damped unit step response. Once the error becomes lower (e.g., about 3 dB lower), a damping factor is applied in all downstream power controllers 55 with the controller response to make them further damped in order to avoid unwanted overshoots while all the upstream power controllers 55 are converging at the same time. If the absolute value of error becomes less than 0.5 dB, the coefficients Kp and Kd are set to 0 (zero) and Ki to a small value effectively transferring the control loop 66 to a slow integral controller to proceed to final convergence (abs($e_t^m$)$_{→0dB}$) avoiding any other system measurement errors. Hence the repose of the PID controller as described in the above equation gets

```
MeasuredErr [iter] = WSSMuxOutTargetPower - WssMuxOutMeasPwr[iter]
P[iter] = Kp * MeasuredErr [iter];
I[iter] = Ki * MeasuredErr [iter] * dT
I[iter] = Ki * (MeasuredErr [iter] + MeasuredErr [iter-1] + ... + MeasuredErr [0]} * dT
I[iter] = Ki * MeasuredErr [iter] * dT + Ki * (MeasuredErr [iter-1] +... + MeasuredErr [0]}*dT
I[iter] = Ki * MeasuredErr [iter] * dT + I[iter-1];
D[iter]= Kd * (1/dT) * (MeasuredErr [iter] - MeasuredErr [iter-1]);
if (iter > 0) && (MeasuredErr [iter-1] < 0), D[iter] = 0.0;
Tmp_Err [iter] = P[iter] + I[iter] + D[iter];
```

Specifically, the measured error, MeasuredErr [iter], is updated as below:

```
State 1: If abs(MeasuredError[iter]) > 3dB, damping_factor = 1.0;
State 2: If abs(MeasuredError[iter]) ≤ 3 dB, damping_factor = 0.5;
State 3: If abs(MeasuredError[iter]) ≤ 0.5 dB, Kp = 0.0; Kd = 0.0; damping_factor = 2.5;
Tmp_Error[iter] = P[iter] + I[iter] + D[iter]; //from the equation above
Tmp_Error[iter] = Tmp_Error[iter] * damping_factor;
``` computed as the difference between target output power and measured output power. The proportional value, P[iter], equals a proportional coefficient, Kp, times the measured error. The integral value, I[iter], equals an integral coefficient, Ki, times the integral of all previously measured errors. The integral value works out to equal the integral coefficient times the measured error, MeasuredErr [iter], times dT plus the previous integral value, l[iter-1]. The value dT can be a time amount related to the iteration, iter. The derivative value, D[iter], equals a derivative coefficient, Kd, times 1/dT times the difference between the measured error, MeasuredErr [iter], and the previously measured error, MeasuredErr [iter-1]. Furthermore, the derivative value, D[iter], is set to zero if the iteration is greater than zero (i.e., not the first iteration) and the previously measured error, MeasuredErr [iter-1], is less than zero. The temporary error correction value, Tmp_Err[iter] equals the proportional value, P[iter], plus the integral value, I[iter], plus the derivative value, D[iter]. In terms of notations, this temporary error correction value is:

$$tmp_t = P_t + I_t + D_t = k_p * e_t^m + k_I * \Sigma_t \left( e_t^m * \Delta t \right) + k_d * \frac{\Delta}{\Delta t}\left( e_t^m \right)$$

Note that the above changes are not applied to an ingress power controller's 150 PID response in order to achieve fastest possible convergence. For example, the ingress power controller 55, in the exemplary embodiment of FIG. 2 is the power controller 55 in the ROADM section 12-1. To maintain the damped response and to avoid any unnecessary oscillations, a forward sequence among the three states of the controller is always maintained.

With respect to the mechanism for handing variable input power 404, in order to run all the cascaded power controllers 55 with the same unit step response (e.g., same PID coefficients for all of the power controllers 55) and to initiate a parallel add over multiple cascaded ROADMs at the same time, the first challenge comes along is the variation in input power for the downstream power controllers 55 while the upstream power controllers 55 are still converging. If the downstream power controllers 55 start ramping up at the same time, they will soon start to overshoot due to the contribution in power from all upstream power controllers 55 even if the unit step response is made very much damped in the control loop 66. To cope with dynamic input power change, an "Expected-Error-Change-Offset" is adapted with each PID response that helps to dampen the response further for downstream power controllers 55 as follows:

```
Expected_Error_Change[iter] = Tmp_Error[iter-1];
Meas_Error_Change[iter] = MeasuredError[iter-1] - MeasuredError[iter];
Error_Offset[iter] = abs(Expected_Error_Change[iter]) - abs(Meas_Error_Change[iter]);
Error_Offset[iter] = Error_Coefficient_Ke * Error_Offset[iter]
```

In terms of notations, $$e_t^{offset} = k_e * \left(|\Delta e_t^x| - |\Delta e_{t-1,t}^m|\right)$$

The estimated Error_Offset is then adjusted to derive the new attenuation settings for the WSS 18 pixels for the channels to add. The attenuation parameter on the WSS is often referred as "Drive".

$$d_t^s = d_t^m - \left(k_p * e_t^m + k_I * \sum_t \left(e_t^m * \Delta t\right)\right) + k_d$$
$$* \frac{\Delta}{\Delta t}\left(e_t^m\right) + k_e * \left(|\Delta e_t^x| - |\Delta e_{t-1,t}^m|\right) + k_s * \left(d_{t-1}^s - d_t^m\right)$$
$$= (1-k_s)d_t^m - \left(k_p * e_t^m + k_I * \sum_t \left(e_t^m * \Delta t\right) + k_d *\right.$$
$$\left. \frac{\Delta}{\Delta t}\left(e_t^m\right) + k_e * \left(|\Delta e_t^x| - |\Delta e_{t-1,t}^m|\right)\right) + k_s * d_{t-1}^s$$

```
Drive_Offset[iter] = Tmp_Error[iter] + Error_Offset[iter];
Meas_Drive[iter] = WSSMuxInput[iter] - WssMuxOutMeasPwr[iter] - WSSMuxCCT_Loss;
Set_Drive[iter]2 = Meas_Drive[iter] - Drive_Offset[iter];
```

In terms of notations and combining equations, $$d_t^{s2} = d_t^m - \left(tmp_t + e_t^{offset}\right)$$
$$= d_t^m - \left(kp * e_t^m + k1 * \sum_t \left(e_t^m * \Delta t\right) + kd * \frac{\Delta}{\Delta t}\left(e_t^m\right) + ke * \left(|\Delta e_t^x| - |\Delta e_{t-1,t}^m|\right)\right)$$

The damping factor term as described in the above equation is inherited within controller coefficients Kp, Ki, and Kd and is not shown in derivation.

With respect to the mechanism for adapting to plant drift and aging effects, the power controller 55 adds another fraction of error on top of its provisioned or applied drive settings regardless of the input power it receives. For example, if a WSS pixel for a specific switch port is drifted or calibrated for 10% drift which means if a 10 dB target attenuation change is applied for that pixel, it may move by 9 dB or 11 dB from its current settings based on which way it is drifted. If the pixel is moved from one input switch position to another, the associated drift may alter as well. The problem becomes more significant if cascaded power controllers 55 start swinging in different drift directions (e.g. one goes in positive and the downstream goes in negative drift on top of their input power variation). To partially cope with the drift, a drive offset parameter is adapted with each PID response as below:

```
Prev_Set_Drive = Set_Drive[iter-1];
Current_Meas_Drive = Meas_Drive[iter];
Drive_Drift_Offset = Prev_Set_Drive - Current_Meas_Drive;
Applied_Drive_Drift_Offset = Drift_Coefficient_Ks * Drive_Drift_Offset;
if (MeasuredError[iter-1] < 0) Applied_Drive_Drift_Offset = 0.0 ;
Set_Drive[iter] = Set_Drive[iter]2 + Applied_Drive_Drift_Offset;
```

In terms of notations, $$d_t^s = d_t^{s2} + k_s * drift_t^{offset}$$
$$= d_t^{s2} + k_s * \left(d_{t-1}^s - d_t^m\right)$$

Figure 3:
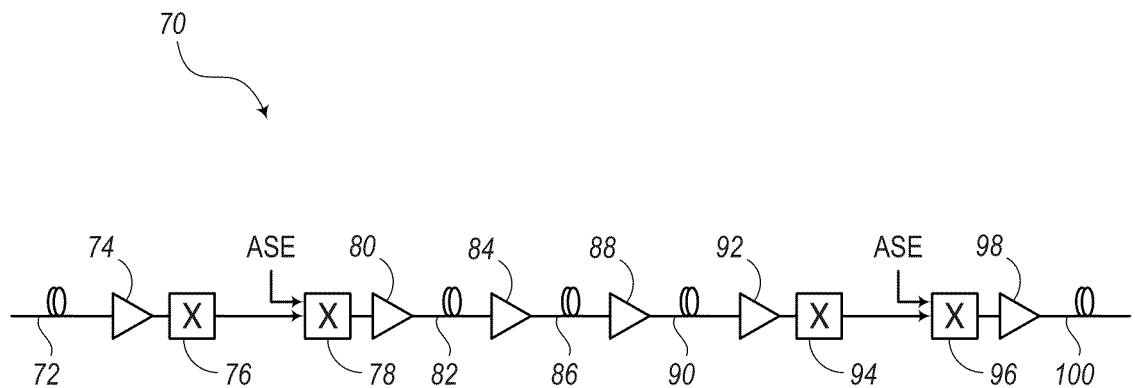
FIG. 3 is a schematic diagram illustrating an optical line system of a network, according to various embodiments.

Combining the two latter equations, the overall drive response can be written as:

FIG. 3 is a schematic diagram illustrating another example of an optical line system 70 of an optical network. In this embodiment, the optical line system 70 may include an upstream link 72, a pre-amplifier 74, and a demultiplexer 76 that provides demultiplexed signals to a respective Optical Multiplex Section (OMS). In this example, the OMS may include a multiplexer 78, a post-amplifier 80 (e.g., Raman amplifier), a first link 82 (e.g., optical link), a first ILA 84, a second link 86 (e.g., optical link), a second ILA 88, a third link 90 (e.g., optical link), a pre-amplifier 92, and a demultiplexer 94. The demultiplexer 96 of the OMS may provide demultiplexed signals to a downstream section. The downstream section may include a multiplexer 96, a post-amplifier 98, and a downstream link 100.

In addition to receiving signals from the demultiplexer 76 from the upstream section, the multiplexer 78 of the OMS may also be configured to receive ASE channel signals (e.g., from an ASE source). For example, the ASE channel signals may be configured as ASE filler channels for filling or loading the portions of the spectrum that are unused. This filling, or ASE-loading, may be achieved for the purpose of regulating the spectrum power density of the optical signals, regardless of how many channels are active. Also, the multiplexer 78 may be configured to add channels (i.e., additional traffic signals) from an adding element of the OMS. Similarly, the demultiplexer 94 may be configured to drop channels as needed.

Optical power controllers (e.g., power controllers 55, 55-1, 55-2, 55-3, 55-4) may be configured to control settings or other operational parameters of the multiplexer 78 and/or demultiplexer 94. Again, the optical power controllers may include a control loop (e.g., control loop 66), not shown in FIG. 3. The optical power controllers may be configured to control the setting or other operation parameters of the post-amplifier 80, ILAs 84, 88, and pre-amplifier 92 at different sections of the optical line system 70. The control of each of these components 78, 80, 84, 88, 92, 94 (by power controllers in control loops associated with each component) may be implemented during a re-calibration procedure.

Figure 4:
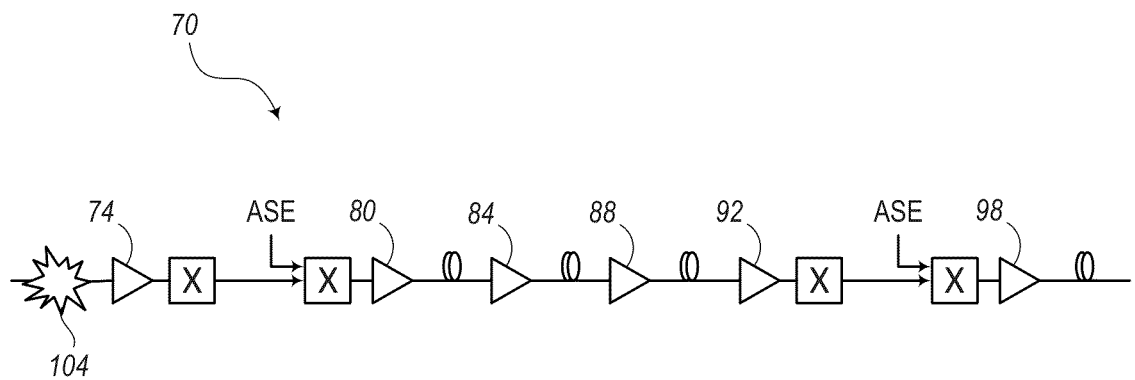
FIG. 4 is a schematic diagram illustrating the optical line system of FIG. 3 in which a perturbation exists, according to various embodiments.

FIG. 4 is a schematic diagram illustrating the optical line system 70 of FIG. 3 in which a perturbation 104 exists. As a result of the perturbation 104, it would be desirable, according to the various systems and the methods of the present disclosure to provide a way to determine where each power controller exists with respect to the perturbation. It may be determined that a power controller associated with amplifier 98 is downstream from the perturbation 104 and includes a disturbance in the power level at this stage. However, it may also be determined that this power controller does not immediately follow the perturbation 104, but is much further downstream from other power controllers that can more effectively accommodate the perturbation 104. The same may be determined for each of the power controllers associated with other amplifiers (e.g., 80, 84, 88, and 92) that are further downstream with respect to the first amplifier that encounters the perturbation, namely, pre-amplifier 74. Because of its position in the cascade of power controllers of the optical line system 70, the power controller associated with the pre-amplifier 74 may be configured to respond according to the various implementations discussed in the present disclosure.

In optical line systems (e.g., optical line system 70), there is a need to control the optical power entering an optical fiber to a particular value such that optimal performance can be achieved by balancing linear noise (e.g., due to optical amplification) with non-linear noise (e.g., introduced via the Kerr effect) in the optical fiber. The Kerr effect may be defined as a change in the refractive index of a material in response to an applied electric field. The optical Kerr effect refers to the case in which the electric field is due to the light itself, which may cause a variation in the index of refraction that is proportional to the local irradiance of the light. This refractive index variation may be responsible for some nonlinear optical effects (e.g., self-focusing, self-phase modulation modulational instability, etc.).

While it may seem obvious that each local control loop can be used to control the optical power entering a fiber, the use of such control loops in a cascaded environment can lead to stability problems in the conventional systems. This is due to the fact that the perturbation 104 in the optical line system 70, which may be caused by noise, fiber pinch, or other condition, is effectively seen instantaneously along the entire length of the optical line system 70. What results in the conventional systems is a number of downstream control loops trying to compensate for the single perturbation 104, and thereby overcompensating for this single condition. This can cause "ringing" of the power levels in the optical line system 70. This problem in the conventional systems can be compounded when an optical network includes a ring topology or a mesh topology, which may result in a permanently unstable system. Ideally, only the power controller (associated with the pre-amplifier 74) directly after the perturbation 104 should react and compensate appropriately. The optical line system in some embodiments may employ a strategy of using loss controllers with a higher level orchestrated power controller which only operates one loop at a time.

However, in many optical networks, such as those including disaggregated optical line systems, there typically is no east-west communications between optical nodes and typically no higher-level controller that is operating on analog parameters (e.g., optical power, channel power, etc.) of the optical line system 70. For example, this is how some network (e.g., Google, Facebook, etc.) want to build and run optical line systems, since it allows these to mix equipment from different vendors in the optical line system 70. As a result, network operators may want equipment to locally maintain optical power targets, which thereby implies that cascaded power controllers will operate according to traditional schemes with all their associated problems as mentioned above.

However, the optical line system 70 of the present disclosure is configured to address the problem of cascaded optical power controllers without east-west communications or employing some form of coordination via a high-level controller. Typically, a heavily damped I-controller (Integral controller) is used and can be cascaded to some limit before serious instability is encountered. When this is done, convergent time may be sacrificed and there may be a point where significant overshoot of the optical power is experienced because of the cascaded nature of the singly damped controller.

Therefore, the optical line system 70 of the present disclosure is configured to employ a form of self-discovery such that any of the individual and independent power controllers 55 associated with the respective amplifiers can infer how far (i.e., an estimated location) they are downstream from the original perturbation 104. Two parameters may be evaluated to make this determination. The first parameter is related to how fast the error term is decreasing and the second parameter is related to whether or not the optical power has experienced a significant overshoot or undershoot (i.e., error term changing sign). Given that the individual power controllers are heavily damped, there is an expectation of these two parameters. The first parameter should exhibit a slow decrease in the error term over time and the second parameter should not exist if there is only one controller responding to one perturbation 104.

If either condition deviates from the expectation, it can be inferred that it is an immediately-positioned downstream controller and modifications to the control loop parameters can be applied. If the first parameter is outside expectations, then actions which weaken the Ki parameter take effect, thereby slowing the local controller. If a significant overshoot or undershoot has occurred at a particular power controller, it may be determined that this controller is an immediately-positioned downstream controller and remedial actions can be taken. Some remedial actions may include making a modification, on a one-time basis, the P term (proportional variable). The one-time modification to the P term can be applied to thwart the incorrect course of the power controller. Both of these actions can therefore lead to a more graceful response of the power controller. That is, the response may result in less overshoot and undershoot of the optical power and may allow for a greater number of power controllers in the concatenation before problems occur.

Figure 5:
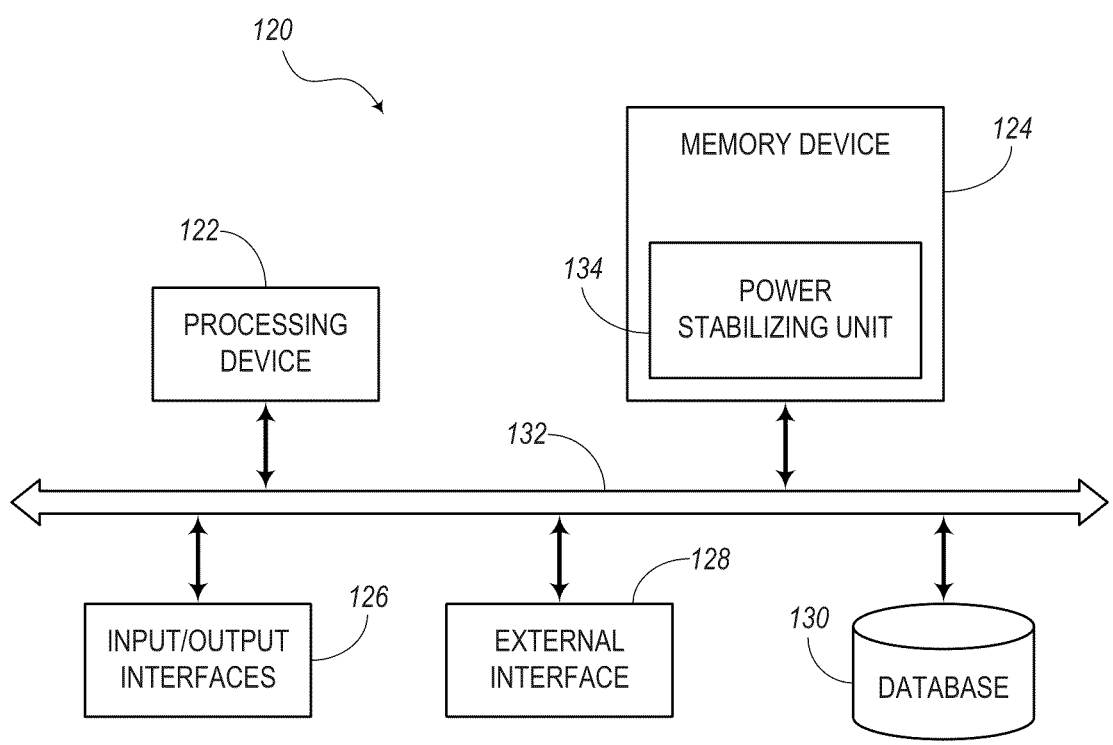
FIG. 5 is a block diagram illustrating an optical power controller for use in an optical line system to control optical power, according to various embodiments of the present disclosure.

FIG. 5 is a block diagram illustrating an embodiment of an optical power controller 120 (e.g., power controller 55 shown in FIG. 1, power controllers 55-1, 55-2, 55-3, 55-4 shown in FIG. 2, etc.) for use in an optical line system to control optical power. In the illustrated embodiment, the optical power controller 120 may be a digital computing device that generally includes a processing device 122, a memory device 124, Input/Output (I/O) interfaces 126, an external interface 128, and a database 130. It should be appreciated that FIG. 5 depicts the optical power controller 120 in a simplified manner, where some embodiments may include additional components and suitably configured processing logic to support known or conventional operating features. The components (i.e., 122, 124, 126, 128, 130) may be communicatively coupled via a local interface 132. The local interface 132 may include, for example, one or more buses or other wired or wireless connections. The local interface 132 may also include controllers, buffers, caches, drivers, repeaters, receivers, among other elements, to enable communication. Further, the local interface 132 may include address, control, and/or data connections to enable appropriate communications among the components 122, 124, 126, 128, 130.

It should be appreciated that the processing device 122, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 122 may also include or utilize stored program instructions (e.g., stored in hardware, software, and/or firmware) for control of the optical power controller 120 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 124 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 124 may incorporate electronic, magnetic, optical, and/or other types of storage media. The memory device 124 may have a distributed architecture, where various components are situated remotely from one another, but can be accessed by the processing device 122.

The memory device 124 may include a data store, database (e.g., database 130), or the like, for storing data. In one example, the data store may be located internal to the optical power controller 120 and may include, for example, an internal hard drive connected to the local interface 132 in the optical power controller 120. Additionally, in another embodiment, the data store may be located external to the optical power controller 120 and may include, for example, an external hard drive connected to the Input/Output (I/O) interfaces 126 (e.g., SCSI or USB connection). In a further embodiment, the data store may be connected to the optical power controller 120 through a network and may include, for example, a network attached file server.

Software stored in the memory device 124 may include one or more programs, each of which may include an ordered listing of executable instructions for implementing logical functions. The software in the memory device 124 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 122), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 122 or other suitable circuitry or logic). For example, when executed, the instructions may cause or enable the processing device 122 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 122), or any suitable combination thereof. Software/firmware modules may reside in the memory device 124, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 126 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 126 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The external interface 128 may be used to enable the optical power controller 120 to communicate with the OPM 48 for receiving power levels monitored by the OPM 48 and to communicate with the WSS 18 for providing control signals to modify the power level of the WSS 18 as needed. In some embodiments, the external interface 128 may also be configured to communicate over a network, the Internet, a Wide Area Network (WAN), a Local Area Network (LAN), and the like. The external interface 128 may include, for example, an Ethernet card or adapter (e.g., 10BaseT, Fast Ethernet, Gigabit Ethernet, 10GbE) or a Wireless LAN (WLAN) card or adapter (e.g., 802.11 a/b/g/n/ac). The external interface 128 may include address, control, and/or data connections to enable appropriate communications on the network.

The optical power controller 120 may also include a power stabilizing unit 134 for stabilizing power levels, such as by a damping process as described herein, in the optical line system 10, 70 or network 60. The power stabilizing unit 134 may be implemented as software and/or firmware in the memory device 124 and/or may be implemented as hardware in the processing device 122. Having any suitable combination of hardware, software, firmware, middleware, etc., the power stabilizing unit 134 may include computer logic, functionality, instructions, etc., for enabling the processing device to perform various steps to stabilize the power levels in the optical line system or network.

Figure 6:
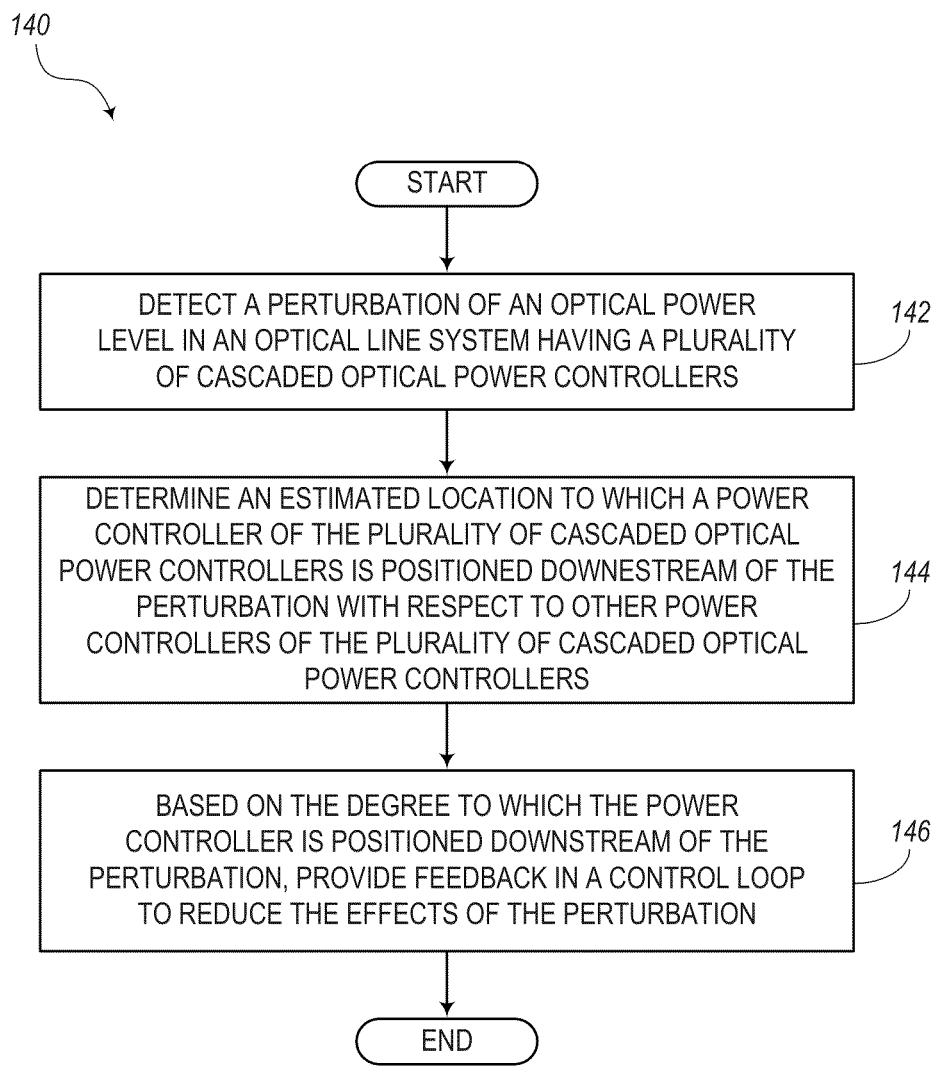
FIG. 6 is a flow diagram illustrating a process for controlling optical power in an optical line system, according to various embodiments of the present disclosure.

FIG. 6 is a flow diagram illustrating a process 140 for controlling optical power in an optical line system. In this embodiment, the process 140 includes the step of detecting a perturbation of an optical power level in an optical line system having a plurality of cascaded optical power controllers, as indicated in block 142. The process 140 also includes the step of determining an estimated location to which a power controller of the plurality of cascaded optical power controllers is positioned downstream of the perturbation with respect to other power controllers of the plurality of cascaded optical power controllers, as indicated in block 144. Based on the estimated location to which the power controller is positioned downstream of the perturbation, the process 140 includes the step of providing feedback in a control loop to reduce the effects of the perturbation, as indicated in block 146.

According to some embodiments, the process 140 may further be defined whereby the optical line system may be a disaggregated system in which there is no communication among the plurality of cascaded optical power controllers and there is no high-level management for orchestrating the plurality of cascaded optical power controllers. The step of determining the estimated location to which the power controller is positioned downstream of the perturbation (block 144) may include a self-discovery procedure that includes determining if the power controller is the first of the plurality of cascaded optical power controllers downstream of the perturbation. This self-discovery procedure, for example, may include determining how the power controller is performing relative to expectations of a classical response to a perturbation in a single controller arrangement. The step of providing feedback in the control loop to reduce the effects of the perturbation (block 146) may include using an Integral-only control procedure. For example, the Integral-only control procedure may involve a step of using a damped integral control to reduce oscillation overshoot and reduce oscillation undershoot.

The process 140 may include additional features as well. For example, the step of determining the estimated location to which the power controller is positioned downstream of the perturbation with respect to other power controllers (block 144) may be based a) a first parameter of how fast an error term is decreasing, and/or b) a second parameter of whether or not the optical power level has experienced significant overshoot or undershoot. The estimated location to which the power controller is positioned downstream of the perturbation may be based on one or more of the first parameter representing a decrease in the error rate that is above a first predetermined threshold and the second parameter representing an overshoot or undershoot that is above a second predetermined threshold. The step of providing feedback in the control loop to reduce the effects of the perturbation (block 146) may include reducing an Integral gain (Ki) parameter. The control loop in this case may be a Proportional-Integral-Derivative (PID) control loop. The step of providing feedback in the control loop (block 146) may further include applying a one-time proportional term (P) to the PID control loop.

According to some embodiments, the process 140 may be executed in a system where each of the plurality of cascaded optical power controllers is part of a Reconfigurable Optical Add/Drop Multiplexer (ROADM). Also, the step of providing feedback in the control loop to reduce the effects of the perturbation (block 146) may include balancing a linear noise parameter with a non-linear noise parameter. For example, the non-linear noise parameter in some embodiments may be an optical Kerr effect.

In some embodiments, some processes may be performed with respect to each optical power controller of a plurality of cascaded optical power controllers of an optical line system where there is no communication between the cascaded optical power controllers and there is no high-level controller for orchestrating the cascaded optical power controllers. The processes may be performed in response to detecting a disturbance or perturbation in an optical power level. These processes, according to some embodiments, may include detecting one or more characteristics of the disturbance to infer a self-discovery procedure as to whether or not the optical power controller is the first of the cascaded optical power controllers downstream from the disturbance (or to what degree the optical power controller is downstream from the disturbance). Based on the estimated location downstream the optical power controller is, the process may include responding accordingly in order to reduce the effects of the disturbance.

These additional processes may use an integral-only control to reduce the effects of the disturbance. They may use a damped integral control to reduce oscillation overshoot/undershoot. The self-discovery procedure may include determining how the optical power controller is performing relative to expectations of a classical response to a disturbance/perturbation in a single controller arrangement.

According to some embodiments, the processes may be further defined whereby the one or more characteristics may include at least one of a first parameter of how fast an error term is decreasing and a second parameter of whether or not the optical power level has experienced significant overshoot or undershoot. The step of determining whether or not the optical power controller is the first of the cascaded optical power controllers downstream from the disturbance may include determining if it is based on the first parameter shows a large decrease (above a predetermined threshold) in the error rate and/or if the second parameter has a significant overshoot/undershoot (above a predetermined threshold). If the optical power controller is the first one directly after the disturbance, then the processes may include reducing the integral gain (Ki) parameter. If the optical power controller is the first one directly after the disturbance, then the processes may include applying a one-time proportional term (P) to a Proportional-Integral-Derivative (PID) control loop.

In some embodiments, the optical line system in these processes may be part of disaggregated optical system. Each of the cascaded optical power controllers may be part of a ROADM. The processes may also be defined whereby the responding step may include modifying control loop parameters and/or may include balancing linear noise parameter with a non-linear noise parameter. For example, the non-linear noise parameter may be an optical Kerr effect parameter.

Figure 9:
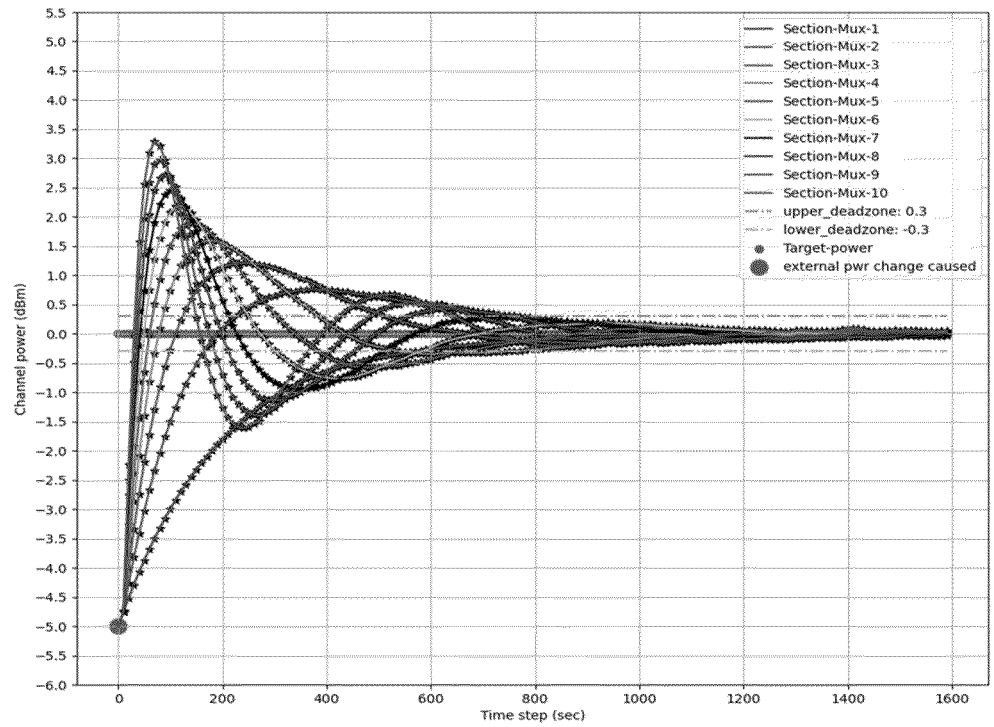
Figure 10:
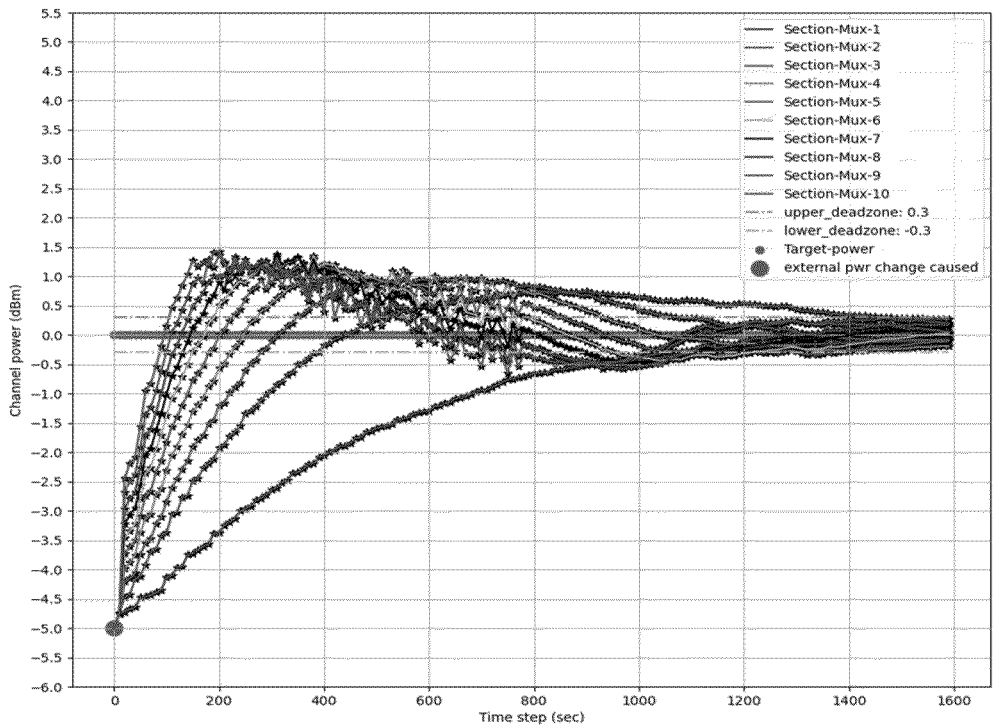
Figure 11:
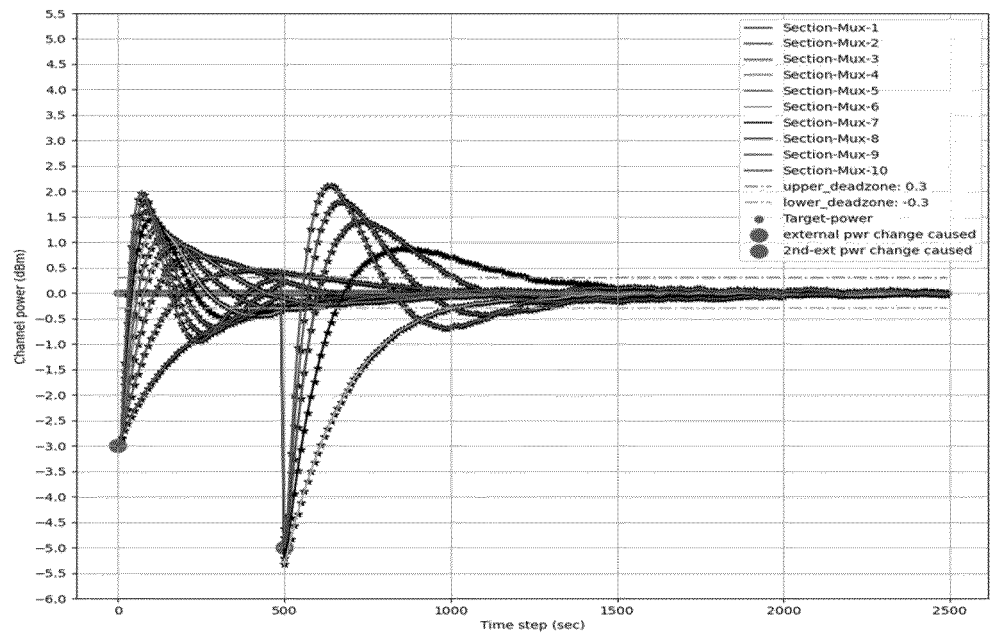
Figure 12:
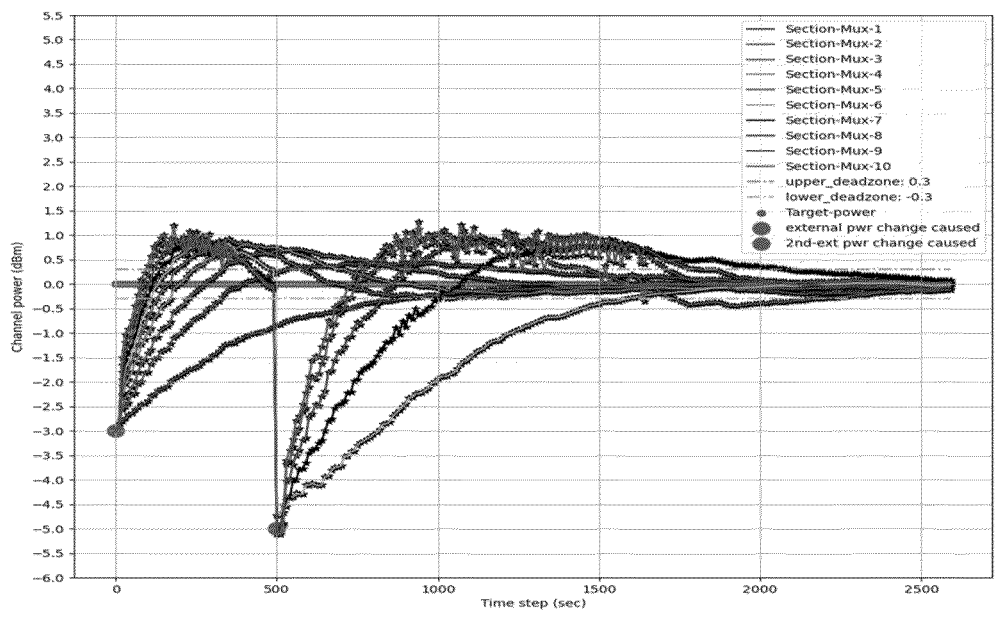
Figure 13:
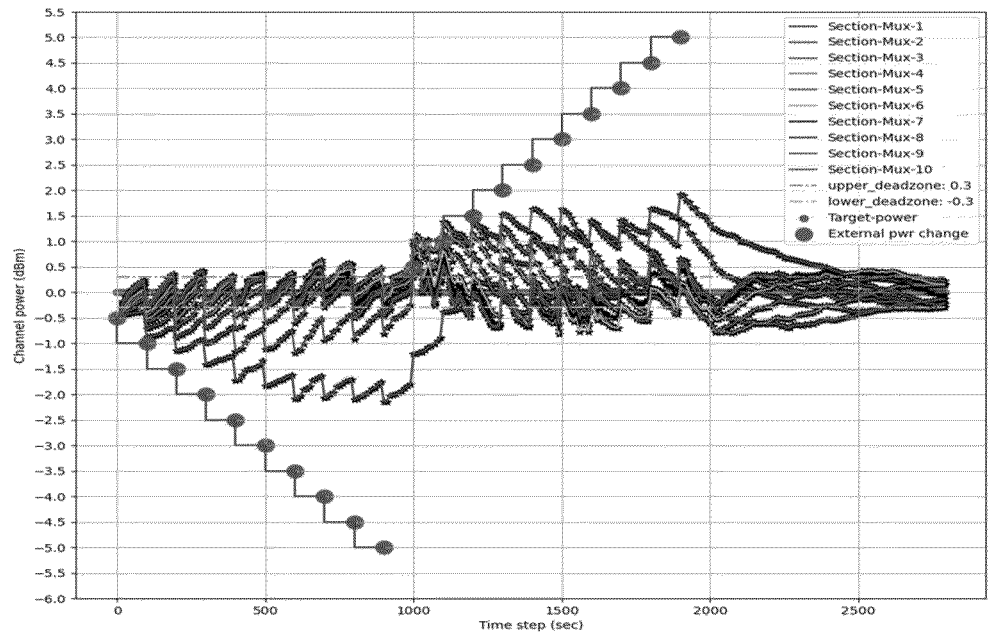
Figure 14:
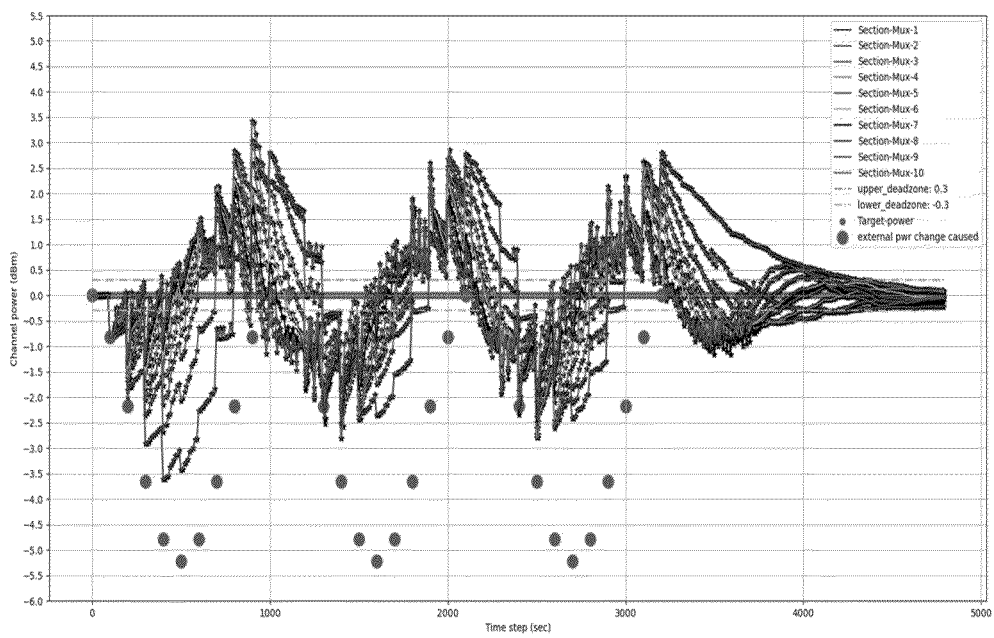

FIGS. 7 - 14 are graphs illustrating power levels of an optical channel utilized for transmission of optical signals in an example optical line system. The power levels demonstrate different responses to different conditions in the optical line system and show the benefits of the embodiments of the present disclosure. FIGS. 7 - 10 show the results of simulation conditions where the number of ROADMs is ten, random noise is applied, and a 5 dB fiber pinch is applied. FIGS. 11 and 12 show results of simulation conditions where the number of ROADMs is ten, random noise applied, a first fiber pinch located at a first section mux is applied with a power drop = 3.0 dB caused at T = 0 secs, and a second fiber pinch located at a sixth section mux is applied with a power drop = 5.0 dB caused at T = 500 secs. FIG. 13 shows results of simulation conditions where the number of ROADMs is ten, random noise is applied, and a varying input power change is applied. FIG. 14 shows results of simulation conditions where the number of ROADMs is ten, random noise is applied, and a periodic varying input power source is applied.

Figure 7:
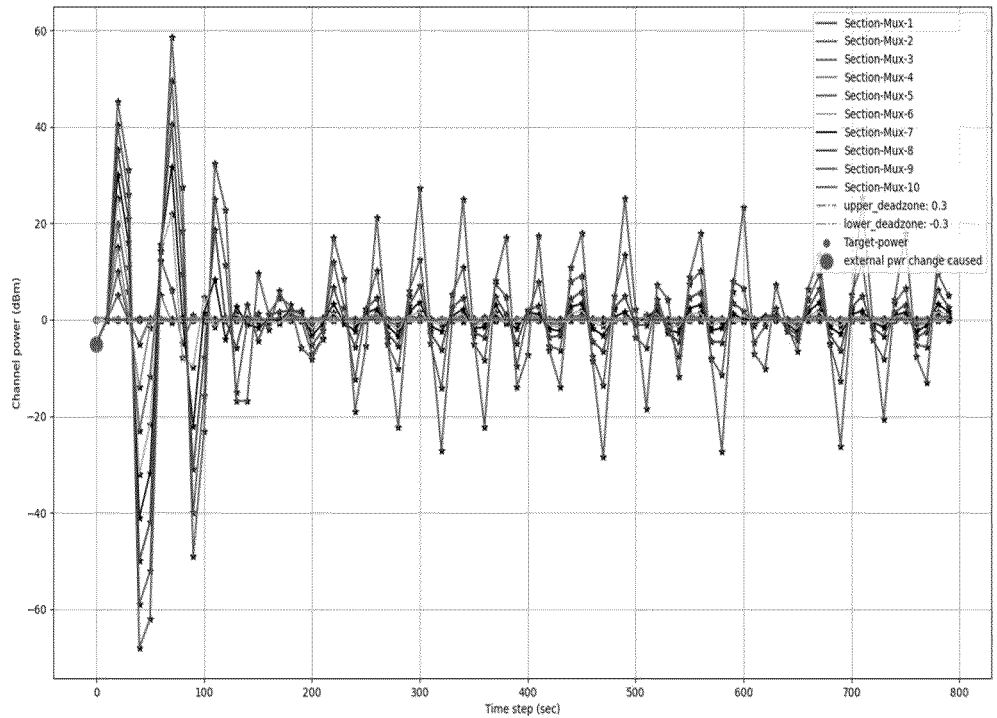
FIGS. 7 - 14 are graphs illustrating power levels of an optical channel utilized for transmission of optical signals in an optical line system, the power levels demonstrating different responses to different conditions in the optical line system, according to various embodiments.

FIG. 7 shows a graph 150 that illustrates the controller response of a standard integral-only power controller. In this example, the integral gain (Ki) is equal to 0.1 and dT is equal to 10 seconds. In the response, the controller has a maximum overshoot of about 60 dB and a maximum undershoot of about -65 dB. There might be no convergence time in this case since the system may continue to experience oscillation that do not converge.

Figure 8:
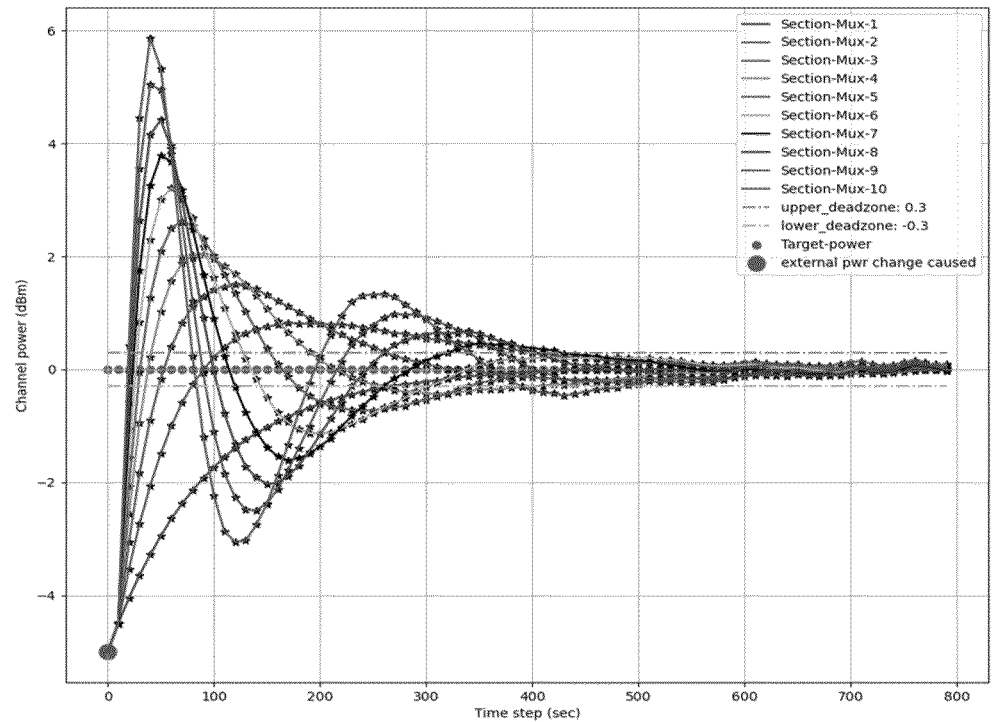

FIG. 8 shows a graph 160 that illustrates the controller response of a standard integral-only power controller. In this example, the integral gain (Ki) is lowered to 0.01 (compared to the FIG. 7 condition) and dT is equal to 10 seconds. In this response, the controller has a maximum overshoot of about 6 dB and a maximum undershoot of about -3 dB, which is a significant improvement over the FIG. 7 example where the overshoot and undershoot is 60 dB and -65 dB, respectively. The convergence time in this case is about 480 seconds. Thus, the Integral-only Ki term is lowered to damp the oscillations.

FIG. 9 shows a graph 170 that illustrates the controller response of a standard integral-only power controller. In this example, the integral gain (Ki) is equal to 0.005 (less than the FIG. 8 example) and dT is equal to 10 seconds. The controller response provides a better response than the FIG. 8 example, where the maximum overshoot is about 3.3 dB and the maximum undershoot is about -1.6 dB. The convergence time in this case is about 600 seconds.

FIG. 10 shows a graph 180 that illustrates the controller response of the integral-only power controller with a damped power controller, such as the power controllers described in the various embodiments of the present disclosure. In this example, the integral gain (Ki) again is equal to 0.005 (less than the FIG. 8 example) and dT is equal to 10 seconds. The controller response provides a better response than the FIGS. 7 - 9 examples, where the maximum overshoot is about 1.5 dB and the maximum undershoot is about -0.7 dB. The convergence time in this case is about 1000 seconds, which is slightly longer than the FIG. 9 example, but provides better stability.

FIG. 11 shows a graph 190 that illustrates the controller response of a standard integral-only power controller and FIG. 12 shows a graph 200 that illustrates the controller response of the integral-only power controller with the damped power controller, such as the power controllers described in the various embodiments of the present disclosure. In comparison, it can be seen that the power controllers (e.g., results shown in FIG. 12) provide a better response (e.g., lower overshoot and undershoot) compared with the standard systems. Again, the simulation in these examples includes two pinches, the first being located at a first section mux with a power drop of 3.0 dB at 0 secs and the second being located at a sixth section mux with a power drop of 5.0 dB at 500 secs. Thus, the second pinch is applied at the downstream section while the system is still attempting to recover from the first upstream pinch. The controller response in the FIG. 11 example includes a maximum overshoot of about 2.2 dB and a maximum undershoot of about -1.0 dB. The controller response in the FIG. 12 example (i.e., based on the present embodiments) includes a maximum overshoot of about 1.4 dB and a maximum undershoot of about -0.5 dB, which again is a significant improvement over the other system, although the convergence time may be slightly longer.

FIG. 13 shows a graph 210 that illustrates the controller response of the damped power controller, such as the power controllers described with respect to the various embodiments of the present disclosure. In this example, the input power is varied. The total accumulated change is 5.0 dB. The fixed step change is +/- 0.5 dB. The rate of occurrence is 30 seconds. Each occurrence of the external power changed (shown as dots in graph 210) is applied discretely in a step function manner as depicted in graph 210. Even with this various power input, the power controllers of the present disclosure are configured to damp the oscillations in a reasonable manner. As such, the controller response has a maximum overshoot of about 2.0 dB and a maximum undershoot of about -2.2 dB.

FIG. 14 shows a graph 220 that illustrates the controller response of the power controller of the present disclosure. In this example, the periodic changing power source is applied. The maximum accumulated total power change applied is about 5.5 dB. The frequency of is about 17 min per cycle. The number of events is 12 per cycle, and the number of cycles is three. Due to the nature of power controllers, if an incoming power source fed into an optical line system has a periodic varying characteristic, where the damped power controller would oscillate along with the input. As shown in the graph 220, the power controller of the present disclosure is able to respond in a way that reducing the overshoot and undershoot. The damped controller oscillates in the same trend as the input power is varying. However, the controller in this case fights against the varying input and is capable of restraining the overshoot and undershoot. Once the input stops changing, the controller is able to bring the level back to the target.

The embodiments of the present disclosure provides improvements over conventional systems. In particular, novelty lies in the local inspection of how the controller is performing relative to the expectation of the classical response of single perturbation single controller response. Deviation from the expectations signals that the present controller is a downstream controller and then appropriate action (e.g., modification) to the control loop parameters can occur. The resulting overall system response is much more desirable and allows for a greater number of power controllers in the cascaded system.

To evaluate deviations from waveform analysis, parameters may be evaluated to determine: 1) how fast the error term is decreasing and 2) if the optical power has experienced a significant overshoot or undershoot (e.g., error term changing sign). Given that the individual controllers are heavily damped, there is an expectation of these two parameters. The first should exhibit a slow decrease in the error term over time and the second should not exist if there is only one controller responding to one perturbation. If either condition deviates from the expectation, it can be inferred that it is a downstream controller and modifications to the control loop parameters can be applied. If the first parameter is outside expectations, then actions which weaken the Ki parameter take effect, thereby slowing the local controller. If a significant overshoot or undershoot has occurred, the present controller is clearly a downstream controller and remedial action can be taken, such as applying a one-time P term (proportional) to thwart the incorrect course of the controller.

The systems of the present disclosure allow for a greater number of cascaded optical power controllers with a more desirable optical response in a disaggregated optical line system environment. Thus, the present disclosure provides damped optical power controllers that can be used in their disaggregated optical network, which may include equipment from different vendors. Since the typical behavior of existing systems in this environment may use factory calibrated quantities to estimate where the power controller actuator needed to be set in open loop, there were residual error parameter monitored in the power levels. The embodiments are configured to overcome these issues and provide improved controller response as seen in the comparison of the graphs of FIGS. 7 - 14.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
   a processing device, and
   a memory device configured to store a computer program having instructions that, when executed, enable the processing device to
   detect a perturbation of an optical power level in an optical line system having a plurality of cascaded optical power controllers,
   determine an estimated location to which a power controller of the plurality of cascaded optical power controllers is positioned downstream of the perturbation with respect to other power controllers of the plurality of cascaded optical power controllers, wherein the estimated location is determined by a self-discovery procedure that includes (i) a determination if the power controller is the first of the plurality of cascaded optical power controllers downstream of the perturbation, and (ii) a determination of how the power controller is performing relative to expectations of a classical response to a perturbation in a single controller arrangement, and
   based on the estimated location to which the power controller is positioned downstream of the perturbation, provide feedback in a control loop to reduce the effects of the perturbation.

2. The system of claim 1, wherein the optical line system is a disaggregated system in which there is no communication among the plurality of cascaded optical power controllers and there is no high-level management for orchestrating the plurality of cascaded optical power controllers.

3. The system of claim 1, wherein providing feedback in the control loop to reduce the effects of the perturbation includes using an Integral-only control procedure.

4. The system of claim 3, wherein using the Integral-only control procedure includes using a damped integral control to reduce oscillation overshoot and reduce oscillation undershoot.

5. The system of claim 1, wherein providing feedback in the control loop to reduce the effects of the perturbation includes reducing an Integral gain (Ki) parameter.

6. The system of claim 1, wherein the control loop is a Proportional-Integral-Derivative (PID) control loop, and wherein providing feedback in the control loop includes applying a one-time proportional term (P) to the PID control loop.

7. The system of claim 1, wherein each of the plurality of cascaded optical power controllers is part of a Reconfigurable Optical Add/Drop Multiplexer (ROADM).

8. The system of claim 1, wherein providing feedback in the control loop to reduce the effects of the perturbation includes balancing a linear noise parameter with a non-linear noise parameter.

9. The system of claim 8, wherein the non-linear noise parameter is an optical Kerr effect.

10. A system comprising:
    a processing device, and
    a memory device configured to store a computer program having instructions that, when executed, enable the processing device to
    detect a perturbation of an optical power level in an optical line system having a plurality of cascaded optical power controllers,
    determine an estimated location to which a power controller of the plurality of cascaded optical power controllers is positioned downstream of the perturbation with respect to other power controllers of the plurality of cascaded optical power controllers, wherein the estimated location is determined based on one or more of a first parameter of how fast an error term is decreasing and a second parameter of whether or not the optical power level has experienced significant overshoot or undershoot, and
    based on the estimated location to which the power controller is positioned downstream of the perturbation, provide feedback in a control loop to reduce the effects of the perturbation.

11. The system of claim 10, wherein the optical line system is a disaggregated system in which there is no communication among the plurality of cascaded optical power controllers and there is no high-level management for orchestrating the plurality of cascaded optical power controllers.

12. The system of claim 10, wherein providing feedback in the control loop to reduce the effects of the perturbation includes using an Integral-only control procedure.

13. The system of claim 10, wherein providing feedback in the control loop to reduce the effects of the perturbation includes reducing an Integral gain (Ki) parameter.

14. The system of claim 10, wherein the control loop is a Proportional-Integral-Derivative (PID) control loop, and wherein providing feedback in the control loop includes applying a one-time proportional term (P) to the PID control loop.

15. The system of claim 10, wherein providing feedback in the control loop to reduce the effects of the perturbation includes balancing a linear noise parameter with a non-linear noise parameter.

16. A system comprising:
a processing device, and
a memory device configured to store a computer program having instructions that, when executed, enable the processing device to
detect a perturbation of an optical power level in an optical line system having a plurality of cascaded optical power controllers,
determine an estimated location to which a power controller of the plurality of cascaded optical power controllers is positioned downstream of the perturbation with respect to other power controllers of the plurality of cascaded optical power controllers, wherein the estimated location is determined based on one or more of a first parameter representing a decrease in an error rate that is above a first predetermined threshold and a second parameter representing an overshoot or undershoot that is above a second predetermined threshold, and
based on the estimated location to which the power controller is positioned downstream of the perturbation, provide feedback in a control loop to reduce the effects of the perturbation.

17. The system of claim 16, wherein the optical line system is a disaggregated system in which there is no communication among the plurality of cascaded optical power controllers and there is no high-level management for orchestrating the plurality of cascaded optical power controllers.

18. The system of claim 16, wherein providing feedback in the control loop to reduce the effects of the perturbation includes using an Integral-only control procedure.

19. The system of claim 16, wherein providing feedback in the control loop to reduce the effects of the perturbation includes reducing an Integral gain (Ki) parameter.

20. The system of claim 16, wherein the control loop is a Proportional-Integral-Derivative (PID) control loop, and wherein providing feedback in the control loop includes applying a one-time proportional term (P) to the PID control loop.

* * * * *